United States Patent
Zhang et al.

(12) 
(10) Patent No.: US 8,426,512 B2
(45) Date of Patent: Apr. 23, 2013

(54) RUBBER COMPOSITION CONTAINING SILICA REINFORCEMENT AND FUNCTIONALIZED POLYBUTADIENE RUBBER AND TIRES HAVING A COMPONENT THEREOF

(75) Inventors: Ping Zhang, Hudson, OH (US); Paul Harry Sandstrom, Cuyahoga Falls, OH (US); William Paul Francik, Bath, OH (US); Junling Zhao, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 491 days.

(21) Appl. No.: 12/550,656

(22) Filed: Aug. 31, 2009

(65) Prior Publication Data

US 2011/0048605 A1 Mar. 3, 2011

(51) Int. Cl.
*C08K 3/34* (2006.01)
*B60C 1/00* (2006.01)
*C08F 136/06* (2006.01)
*C08C 19/00* (2006.01)

(52) U.S. Cl.
USPC .............. 524/493; 152/209.5; 526/340.4

(58) Field of Classification Search ............... 152/209.5; 526/340.4; 525/342
See application file for complete search history.

(56) References Cited

U.S. PATENT DOCUMENTS

| | | | |
|---|---|---|---|
| 5,227,425 A | 7/1993 | Rauline | 524/493 |
| 5,244,028 A | 9/1993 | Segatta et al. | 152/525 |
| 6,046,266 A | 4/2000 | Sandstrom et al. | 524/492 |
| 6,486,258 B1 * | 11/2002 | Noguchi et al. | 525/191 |
| 6,627,721 B1 * | 9/2003 | Rodewald et al. | 526/338 |
| 6,977,281 B1 | 12/2005 | Ozawa et al. | 525/377 |
| 7,202,306 B2 | 4/2007 | Tanaka et al. | 525/331.9 |
| 7,222,650 B2 | 5/2007 | Halasa et al. | 152/209.1 |
| 2005/0239946 A1 * | 10/2005 | Lin et al. | 524/492 |
| 2006/0004131 A1 * | 1/2006 | Ozawa et al. | 524/342 |
| 2009/0203826 A1 * | 8/2009 | Rachita et al. | 524/445 |
| 2010/0006199 A1 * | 1/2010 | Ohta et al. | 152/522 |
| 2010/0130664 A1 * | 5/2010 | Rachita et al. | 524/445 |
| 2011/0041976 A1 * | 2/2011 | Saeki et al. | 152/538 |

FOREIGN PATENT DOCUMENTS

| | | |
|---|---|---|
| EP | 989161 | 3/2000 |
| EP | 1449857 | 8/2004 |
| EP | 2060604 | 5/2009 |
| JP | 11349632 A * | 12/1999 |

OTHER PUBLICATIONS

Machine translation of JP 11349632 A, 1999.*
European Search Report completed Dec. 1, 2010.

* cited by examiner

*Primary Examiner* — Hui Chin
(74) *Attorney, Agent, or Firm* — Henry C. Young, Jr.

(57) ABSTRACT

This invention relates to a silica reinforcement-containing rubber composition which contains a functionalized polybutadiene rubber to promote a relatively low hysteretic loss to thereby enhance its desirability for tire sidewall and subtread applications in a sense of advantageously promoting reduced tire rolling resistance without significantly compromising various other desirable tire performance parameters.

3 Claims, No Drawings

RUBBER COMPOSITION CONTAINING SILICA REINFORCEMENT AND FUNCTIONALIZED POLYBUTADIENE RUBBER AND TIRES HAVING A COMPONENT THEREOF

FIELD OF INVENTION

This invention relates to a silica reinforcement-containing rubber composition which contains a functionalized polybutadiene rubber to promote a relatively low hysteretic loss to thereby enhance its desirability for tire sidewall and subtread applications in a sense of advantageously promoting reduced tire rolling resistance without significantly compromising various other desirable tire performance parameters.

BACKGROUND OF THE INVENTION

It is sometimes desired to provide vehicular rubber tires with reduced rolling resistance to promote fuel economy for the associated vehicle.

The use of silica reinforcement together with a silica coupling agent in a tread rubber composition has been mentioned for promoting improved (reduced) rolling resistance for a tire where a solution polymerization prepared styrene/butadiene rubber (S-SBR) is used (for example see U.S. Pat. No. 5,227,425) and where a functionalized styrene/butadiene rubber is used (for example see U.S. Pat. Nos. 7,202,306 and 7,222,650).

Rubber compositions with reduced reinforcing filler contents (for example reduced carbon black contents), rubber compositions with increased crosslinking density and rubber compositions which contain one or more elastomers with a relatively low glass transition temperature (Tg) have been proposed for tire treads to promote a reduction in the rubber hysteresis of the tread and an associated lower rolling resistance for the tire itself.

However, it is well known to those skilled in such art that reducing the tire tread rubber hysteresis for a purpose of reducing the rolling resistance of the tire typically results in a reduction of one or more other desirable tire tread properties such as, for example, a reduction in tread traction, or tread grip.

It is therefore desirable to promote a reduction in hysteresis of a rubber composition for a tire component, usually predictive of an increased rebound property of the rubber composition itself, to thereby promote a reduction in a tire's rolling resistance without significantly degrading one or more various other tire performance properties.

Such contemplated tire components for this invention are a tire sidewall, particularly an outer tire sidewall rubber layer which does not contain cord reinforcement and is exposed to atmosphere conditions, physical scuffing and substantial flexing, as well as a tire undertread (which might be referred to as a subtread) rubber layer which also does not contain cord reinforcement and which underlies the tire outer tread rubber layer with its running surface for the tire tread. Such undertread rubber layer may be found in a tire with a tread of a cap/undertread construction with an outer tread cap rubber layer which contains the running surface of the tire and an undertread rubber layer as a tread base layer or an intermediate rubber layer positioned intermediately between a tread outer rubber cap layer and a tread base rubber layer.

A significant aspect of this invention is a focus on a tire's undertread (subtread) rubber layer in a sense that the rubber composition used for the undertread rubber layer may be used to promote a reduced rolling resistance for the tire in the sense of the rubber composition having a higher rebound value, without significantly compromising various other physical properties of the tread, and to thereby promote an increased fuel efficiency for an associated vehicle.

An additional significant aspect of this invention is a focus upon an outer tire sidewall rubber layer which also contributes to a tire's rolling resistance because of its relatively large deformation (e.g. considerable flexing) during working of the tire where hysteresis loss of its rubber composition and associated tendency of increased internal heat generation may be a factor as described in a paper entitled "Fundamentals of Rolling Resistance" published in *Rubber Chemistry and Technology*, Volume 74(3), Pages 525 through 539 (year 2001). This is considered significant for use of the rubber composition as an outer tire sidewall rubber layer in a sense of the rubber composition demonstrating a higher rebound value and therefore promoting a prospectively lower internal heat generation and lower hysteresis loss and thereby promoting an increased fuel efficiency for an associated vehicle.

A unique advantage of promoting a reduction in rolling resistance of tires through the modification of the rubber composition of the outer tire sidewall component, whether by material variations or by structural changes to promote a reduced hysteresis loss of the sidewall rubber composition is that tire tread tire performances, such as treadwear and traction, are less likely to be compromised.

In practice, an outer tire sidewall component is often comprised of a mixture of natural rubber and polybutadiene rubber. Particulate rubber reinforcement in a form of carbon black is historically used in the rubber composition for the outer sidewall rubber layer.

In some instances, an inclusion of silica together with carbon black has been suggested for tire sidewall rubber compositions. For example, see U.S. Pat. No. 5,244,028 in which a small quantity of silica in an amount of about 1.0 to 5.0 phr, with low pH values to promote resistance to weathering, and U.S. Pat. No. 6,046,266 with about 20 to 60 phr of silica, together with natural rubber and polybutadiene rubber, to promote an increase in durability and cut growth resistance for the rubber composition.

It has now been discovered that hysteresis loss of a rubber composition can be significantly reduced through the use of a functionalized polybutadiene rubber in combination with silica and a silica coupling agent which may be suitable for use as a tire component such as for a tire subtread or tire outer sidewall component, to promote reduced rolling resistance of the tire without significantly degrading one or more other performance factors for the tire.

The term "subtread" relates to a portion of a vehicular tire tread of a multilayered configuration with an outer circumferential tread cap rubber layer with a running surface for ground-contacting purposes and an underlying rubber tread layer which underlies the tread cap rubber layer and is referred to herein as a "subtread" or "undertread". It is usually not intended to be ground-contacting. For some tread configurations, the subtread is considered as being a tread base rubber layer which interfaces with an underlying overlay layer or tread belt layer. In other tread configurations, the subtread may be an intermediate tread rubber layer positioned between the outer tread cap rubber layer and a tread base rubber layer.

The term "sidewall" component refers to an outer tire sidewall rubber layer normally positioned outside of (axially outward from) the tire carcass ply layers and usually an outer sidewall rubber layer which may be visually observable and atmospherically exposed. Such sidewall rubber layer is usually subject to extensive flexing scuffing as would be well known to one having skill in such art.

In the description of this invention, the term "phr" where used relates to parts by weight of an ingredient per 100 parts by weight of rubber, unless otherwise indicated.

The terms "rubber" and "elastomer" are used interchangeably unless otherwise indicated. The terms "vulcanized" and "cured" are used interchangeably unless otherwise indicated. The terms "compound" and "rubber composition" may be used interchangeably unless indicated.

SUMMARY AND PRACTICE OF THE INVENTION

In accordance with this invention a pneumatic tire is provided having at least one of an outer sidewall rubber layer and subtread component of a rubber composition comprised of, based on parts by weight per 100 parts by weight of rubber (phr):

(A) Conjugated diene-based elastomers comprised of:
  (1) about 20 to about 80 phr of:
    (a) a siloxy functionalized cis 1,4-polybutadiene elastomer having an end terminating group reactive with hydroxyl groups contained on said precipitated silica provided by a terminating compound represented by the general formula (I):

where X can be a halogen atom selected from a chlorine atom, a bromine atom and an iodine atom; R can be an alkyl group with from about 1 to about 7 carbon atoms (e.g., 1, 2, 3, 4, 5, 6, or 7 carbon atoms); R' is a alkyl group with from about 1 to about 20 carbon atoms, an aryl group, a vinyl group or a halogenated alkyl group; m is an integer of 1, 2, 3, or 4, n is an integer of 0, 1, or about 2, and the sum of n and m is 1, 2, 3, or 4.
    (b) an amine functionalized cis 1,4-polybutadiene elastomer having an end terminating amine group reactive with hydroxyl groups contained on said precipitated silica
    (c) a siloxy-aldimine functionalized cis 1,4-polybutadiene elastomer having an end terminating group reactive with hydroxyl groups contained on said precipitated silica provided by a terminating compound containing a siloxy and an aldimine group represented by the general formula (II):

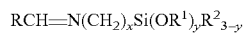

wherein R represents a group consisting of an aryl or substituted aryl having 6 to 18 carbon atoms, or a heterocycle or heteroaryl having 3 to 18 carbon atoms; $R^1$ and $R^2$ may be the same or different and each independently represents a group having 1 to 18 carbon atoms selected from an alkyl, a cycloalkyl, an allyl, or an aryl; X is an integer from 1 to 20; and Y is an integer from 1 to 3.
  (2) about 20 to about 80 phr of at least one additional conjugated diene based elastomer (in addition to said functionalized cis 1,4-polybutadiene elastomers) comprised of at least one of polymers of at least one of isoprene and 1,3-butadiene and copolymers of styrene and at least one of isoprene and 1,3-butadiene, and
(B) about 30 to about 70 phr of rubber reinforcing filler comprised of rubber reinforcing carbon black and synthetic amorphous silica (precipitated silica) as:
  (1) about 20 to about 60 phr of said rubber reinforcing carbon black, and
  (2) about 20 to about 60 phr of said precipitated silica, and
(C) coupling agent for said precipitated silica having a moiety reactive with hydroxyl groups on said precipitated silica (e.g. silanol groups) and another different moiety interactive with said elastomer(s).

For the above mentioned siloxy functionalized cis 1,4-polybutadiene elastomer of the above Formula I, in some embodiments, it is considered that one or more of the —OR group(s) are hydrolyzable, by, for example, steam stripping procedures (such as those disclosed in U.S. Pat. No. 5,066,721).

For the siloxy terminated cis 1,4-polybutadiene elastomer of the above Formula I, an example of a terminating compound is TEOS, or tetraethyl orthosilicate, where the associated cis 1,4-polybutadiene elastomer might be referred to as a TEOS terminated 1,4-polybutadiene elastomer, and where the TEOS may be represented by the general formula (III):

In general the terminating compound to prepare the siloxy terminated cis 1,4-polybutadiene elastomer can be synthesized, or prepared, by various methods, including, for example, methods presented in U.S. Pat. No. 5,066,721, which is herein incorporated by reference in its entirety.

For the above mentioned siloxy-aldimine terminated cis 1,4-polybutadiene elastomer of the above Formula II, in one embodiment, for the terminating compound for preparation of the functionalized cis 1,4-polybutadiene elastomer R is selected from phenyl, substituted-phenyl, naphthyl, substituted-naphthyl, or heteroaryl groups. In another embodiment, R is phenyl. In a further embodiment, at least one $R^1$ group is an ethyl radical.

In practice, for the siloxy-aldimine terminated cis 1,4-polybutadiene elastomer of the above Formula II, it is envisioned that the aldimino group can hydrogen bond with a variety of acidic functional groups and is susceptible to nucleophilic addition at the imine carbon. It is envisioned that the siloxy group can undergo a condensation reaction with a silanol group on the surface of silica and is susceptible to nucleophilic substitution at the silicon atom.

In a further embodiment of the siloxy-aldimine cis 1,4-polybutadiene elastomer of the above Formula II, the terminating compound bearing the siloxy and aldimine groups may be represented by the general formula (IV):

(which may sometimes be referred herein to as an "imine-TEOS" compound, with TEOS being an abbreviation for tetraethyl orthosilicate, and the resulting functionalized cis 1,4-polybutadiene elastomer may be referred to as an "imine-TEOS functionalized cis 1,4-polybutadiene elastomer"), where R is an aryl or substituted aryl group having from 6 to 18 carbon atoms, or a heterocycle or heteroaryl group having from 3 to 18 carbon atoms, and where x is an integer in a range of from 1 to 20.

A significant aspect of the invention is a tire having a sidewall component of said rubber composition which contains said functionalized cis 1,4-polybutadiene elastomer in a sense that it has been observed that the presence of the functionalized elastomer in the rubber composition which contains both carbon black and silica reinforcement contributed to enhancing its rebound physical property which is indicative of promoting a reduction in rolling resistance and reduction in internal heat generation, reduction in hysteresis, of the tire having such sidewall component and hence a predictive fuel economy, or savings, for an associated vehicle.

A further significant aspect of the invention is a tire having a circumferential subtread layer of a rubber composition which contains said functionalized cis 1,4-polybutadiene elastomer in a sense that it has been observed that the presence of the functionalized elastomer in the rubber composition which contains both carbon black and silica reinforcement contributed to enhancing its rebound physical property which is indicative of promoting a reduction in rolling resistance of the tire having a tread of such subtread component and hence a fuel economy, or savings, for an associated vehicle.

For the amine functionalized cis 1,4-polybutadine elastomer, a representative example is BR 1256H™ from the Nippon Zeon Company.

For the alkoxy terminated cis 1,4-polybutadiene of Formula I, a TEOS functionalized cis 1,4-polybutadiene may be prepared, for example, by polymerizing 1,3-butadiene monomer to form a polymer by using an organolithium compound as an initiator in a hydrocarbon solvent and reacting an active terminal end of the polymer with a functionalized terminating agent represented by the General Formula I.

For the alkoxy-imine functionalized cis 1,4-polybutadiene elastomer of Formula II, an imine-TEOS functionalized cis 1,4-polybutadiene may be prepared, for example, by polymerizing monomers comprised of 1,3-butadiene and at least one amine monomer and to form a polymer with amine functionality in its molecular chain followed by reacting an active terminal end of the polymer with a functionalized terminating compound to provide a terminating group on the polymer, wherein the terminating compound is comprised of the general Formula (IV), which is considered herein as being a variation of Formula (II).

Representative of such amine monomer is, for example:

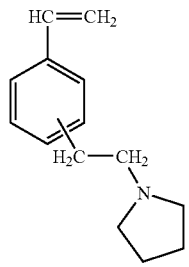

A representative example of such functionalized terminating agent taken from Formula (IV) is, for example, N-benzylidene-3-(triethoxysilyl)-1-propaneamine or N-naphthylidene-3-(triethoxysilyl)-1-propaneamine.

In practice, representative of various of said additional diene-based elastomers for the rubber compositions are comprised of, for example, polyisoprene rubber (both natural polyisoprene rubber such as for example SMR20, namely smoked rubber sheet number 20, and synthetic polyisoprene rubber such as, for example, NAT2200™ from The Goodyear Tire & Rubber Company) and cis 1,4-polybutadiene as CB25™ from the Lanxess Company, styrene/butadiene rubber and non-functionalized cis 1,4-polybutadiene rubber.

It is readily understood by those having skill in the art that the rubber composition can be prepared, or compounded, by methods generally known in the rubber compounding art, such as, for example, mixing the various sulfur-vulcanizable constituent rubbers with various commonly used additive materials such as, for example, curing aids, such as sulfur, activators, retarders and accelerators, processing additives, such as oils, resins including tackifying resins and plasticizers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention, unless otherwise indicated herein.

The tires can be built, shaped, molded and cured by various methods which will be readily apparent to those having skill in such art.

The following examples are provided to further illustrate the invention where amounts and percentages of materials are presented in terms of weight unless otherwise indicated.

EXAMPLE I

Rubber compositions (rubber compounds) composed of a combination of natural rubber (cis 1,4-polyisoprene rubber) and various cis 1,4-polybutadiene elastomers, including functionalized cis 1,4-polybutadiene elastomers, were prepared.

Rubber compound 1 was a Control rubber composition which used a combination of natural rubber and cis 1,4-polybutadiene rubber A.

Rubber compound 2 was also a Control rubber composition which used a combination of natural rubber and cis 1,4-polybutadiene rubber B, where the cis 1,4-polybutadiene rubber was prepared by polymerizing 1,3-butadiene monomer in the presence of a neodymium containing catalyst system such as, for example, CB25™ from the Lanxess Company.

Rubber compound 3 was a rubber composition which used a combination of natural rubber and an amine functionalized cis 1,4-polybutadiene rubber C as BR 1256H™ from the Nippon Zeon Company.

Rubber compound 4 was a rubber composition which contained a combination of natural rubber and a TEOS functionalized cis 1,4-polybutadiene rubber D, referred to herein as BR TEOS, from The Goodyear Tire & Rubber Company.

Rubber compound 5 was a rubber composition which contained a combination of natural rubber and a TEOS-imine functionalized cis 1,4-polybutadiene rubber E, referred to herein as BR Imine-TEOS, from The Goodyear Tire & Rubber Company.

The rubber compositions were prepared by mixing the ingredients in three sequential mixing steps, namely two non-productive (NP1 and NP2) followed by a productive mixing step (PR) in an internal rubber mixer. The dump temperature from the internal rubber mixer after completing the NP1 and NP2 mixing steps was 160° C. The dump temperature after completing the subsequent PR mixing step was 110° C.

For this Example, both of the carbon black and silica reinforcement fillers as well as the silica coupling agent were added in the NP1 non-productive mixing stage with the respective cis 1,4-polybutadiene elastomers.

The basic recipe for the rubber compounds is presented in the following Table 1 and recited in parts by weight unless otherwise indicated.

TABLE 1

| | Parts |
|---|---|
| First Non-Productive Mixing Step (NP1), mixed to about 160° C. | |
| Cis 1,4-Polyisoprene natural rubber[1] | 50 |
| Polybutadiene elastomers A and B and functionalized polybutadienes C, D and E[2] | 50 |
| Carbon black N550 | 30 |
| Silica[3] | 30 |
| Silica coupling agent[4] | 2.4 |
| Rubber processing oil and resin | 7 |
| Wax and antioxidant | 5.5 |
| Stearic acid | 1 |
| Second Non-Productive Mixing Step (NP2), mixed to about 160° C. | |
| No ingredients added in this mixing step, sometimes referred to as "re-milling" | |
| Non-Productive Mixing Step (PR), (mixed to about 110° C.) | |
| Sulfur | 1.5 |
| Zinc oxide | 1.5 |
| Antioxidant | 1.25 |
| Sulfenamide sulfur cure accelerator | 2.1 |

[1]Natural rubber as SMR20 having a cis 1,4 content of about 99.8 percent and a Tg of about −65° C.
[2-A]Cis 1,4-polybutadiene rubber A as BUD 1208 ™ from the Goodyear Tire & Rubber company having a cis 1,4 content of at least about 97 percent and a Tg of about −106° C.
[2-B]Cis 1,4-polybutadiene B prepared by polymerizing 1,3-butadiene monomer by Neodymium catalysis as CB25 ™ from the Lanxess Company reportedly having a cis 1,4 content of at least about 98 percent and a Tg of about −106° C.
[2-C]Amine-functionalized cis 1,4-polybutadiene rubber C, as BR 1256H ™ from the Nippon Zeon Company reportedly having a Tg of about −94° C.
[2-D]TEOS-functionalized cis 1,4-polybutadiene rubber D, from The Goodyear Tire & Rubber Company having a Tg of about −93° C.
[2-E]Imine-TEOS-functionalized cis 1,4-polybutadiene rubber E, from The Goodyear Tire & Rubber Company having a Tg of about −95° C.
[3]Precipitated silica as Hi-Sil 243 from the PPG company having an indicated BET surface area of 135 m$^2$/g
[4]Silica coupling agent comprised of bis(3-triethoxysilylpropane) polysulfide having an average in a range of from about 2 to about 2.6 connecting sulfur atoms in its polysulfidic bridge as Si266 ™ from the Evonik/Degussa Company The following Table 2 illustrates processing characteristics and various physical properties of rubber compositions based upon the basic recipe of Table 1.

TABLE 2

| | Rubber Compound Numbers | | | | |
|---|---|---|---|---|---|
| | 1 | 2 | 3 | 4 | 5 |
| Elastomers (phr) | | | | | |
| Natural Rubber | 50 | 50 | 50 | 50 | 50 |
| Cis 1,4-polybutadiene A | 50 | 0 | 0 | 0 | 0 |
| Cis 1,4-polybutadiene B | 0 | 50 | 0 | 0 | 0 |
| Amine functionalized polybutadiene C | 0 | 0 | 50 | 0 | 0 |
| TEOS functionalized polybutadiene D | 0 | 0 | 0 | 50 | 0 |
| Imine-TEOS functionalized polybutadiene E | 0 | 0 | 0 | 0 | 50 |
| Rheometer (RPA Analyzer)[1], 170° C. | | | | | |
| Maximum torque (dNm) | 14.7 | 15.5 | 17.1 | 17.9 | 17.8 |
| Minimum torque (dNm) | 2.5 | 2.9 | 2.8 | 3.7 | 4.6 |
| T90 (minutes) | 3.6 | 3.6 | 3.9 | 3.9 | 3.9 |
| Mooney Scorch, 120° C. | | | | | |
| Scorch time 5 pt rise (minutes) | 36.7 | 34.7 | 33.8 | 32.4 | 36 |
| RPA Analyzer[1], 100° C. | | | | | |
| Cured G' at 1% strain (MPa) | 2.2 | 2 | 2.3 | 2.4 | 2.1 |
| Cured G' at 10% strain (MPa) | 1.3 | 1.3 | 1.5 | 1.6 | 1.5 |
| Tan delta at 10% strain | 0.164 | 0.142 | 0.138 | 0.131 | 0.119 |
| Stress-strain, ATS[2], 11 min, 170° C.[2] | | | | | |
| Tensile strength (MPa) | 18.1 | 19.2 | 19.2 | 18.1 | 18.5 |
| Elongation at break (%) | 707 | 688 | 647 | 642 | 601 |
| 100% modulus (MPa) | 1.3 | 1.3 | 1.5 | 1.5 | 1.6 |
| 300% modulus (MPa) | 6.2 | 6.5 | 6.6 | 6.5 | 7.5 |
| Rebound | | | | | |
| 23° C. | 48.9 | 53.6 | 56.9 | 57.4 | 59.1 |
| 100° C. | 58.5 | 62.3 | 65.2 | 66.4 | 68.3 |
| Shore A Hardness | | | | | |
| 23° C. | 59 | 59 | 61 | 61 | 61 |
| 100° C. | 54 | 54 | 56 | 57 | 57 |
| DIN Abrasion[3], 23° C. | | | | | |
| Relative Vol. Loss | 80 | 70 | 76 | 75 | 72 |

TABLE 2-continued

| | Rubber Compound Numbers | | | | |
|---|---|---|---|---|---|
| | 1 | 2 | 3 | 4 | 5 |
| RDS[4] Strain Sweep, 10 Hertz, 30° C. | | | | | |
| Storage modulus (G'), at 10% strain, (MPa) | 1.5 | 1.6 | 1.7 | 1.8 | 1.8 |
| Tan delta, at 10% strain | 0.162 | 0.139 | 0.126 | 0.118 | 0.118 |

[1]Data according to Rubber Process Analyzer as RPA 2000 ™
[2]Data according to Automated Testing System (ATS) instrument by the Instron Corporation which incorporates six tests in one system. Such instrument may determine ultimate tensile, ultimate elongation, moduli, etc. Modulus data reported in the Table is generated by running the ring tensile test.
[3]DIN-53516
[4]Data by rheometric spectrometric analytical instrument It can be seen from Table 2 that the replacement of the cis 1,4 polybutadiene rubber A in rubber compound 1 with cis 1,4-polybutadiene rubber B in rubber compound 2 or functionalized polybutadiene rubber Samples C through E in rubber compounds 3, 4 and 5, respectively, did not significantly affect the rubber composition processing, such as the Mooney scorch time, and cure dynamics, measured by MDR which included the T90 cure time, of the rubber composition.

This is considered to be significant, as will be further discussed hereafter, in a sense that observed enhancement of physical properties of the rubber composition such as rebound and tan delta, which is indicative of beneficial hysteresis reduction, or loss by the use of functionalized polybutadienes C through E of rubber compounds 3, 4 and 5 instead of the non-functionalized polybutadiene elastomers A and B of rubber compounds 1 and 2, all of which included precipitated silica reinforcement together with a silica coupling agent, was not obtained at the expense of processibility of the rubber composition, insofar as the Mooney scorch time, as well as T90 cure time were concerned.

It can be seen from Table 2 that the rebound values at room temperature (about 23° C.) and rebound values at high temperature (100° C.) of the rubber composition were significantly improved (increased) as a result of replacing the cis 1,4-polybutadiene A with the amine, TEOS and imine-TEOS functionalized polybutadiene elastomers C through E. Also, the hysteresis loss indicative tan delta property at 30° C. of the rubber composition was significantly enhanced (reduced) as a result of replacing the non-functionalized cis 1,4-polybutadiene elastomer A and B with the amine, TEOS and imine-TEOS functionalized cis 1,4-polybutadiene elastomers C through E.

For example, it is seen that the rebound values at 23° C. and 100° C. of the experimental Rubber compound 5, using imine-TEOS functionalized polybutadiene elastomer E were beneficially about 10 points higher than that of the comparative (Control) rubber compound 1 using the non-functionalized polybutadiene elastomer A.

Also, it can further be seen that the hysteresis loss indicative tan delta at 30° C. of the rubber composition was significantly enhanced (reduced) as a result of replacing the non-functionalized cis 1,4-polybutadiene elastomer A or B of rubber compounds 1 and 2 with the amine, TEOS and imine-TEOS functionalized cis 1,4-polybutadiene elastomers C through E of the rubber compounds 3, 4 and 5, respectively.

In particular, the tan delta value for rubber compounds 3, 4 and 5 using the functionalized cis 1,4-polybutadiene elastomers were only 0.126, 0.118 and 0.118, respectively, and therefore significantly lower than the value of 0.162 for comparative (Control) rubber compound 1.

It can also be seen that indication of hysteresis loss as suggested by the indicated tan delta values at 100° C. of the rubber compound 5 using imine-TEOS functionalized polybutadiene E, for example, was significantly lower than that of the comparative (Control) rubber compound 1 using the non-functionalized cis 1,4-polybutadiene A.

It is noted that some improvement in rebound value and hysteresis loss tan delta value was observed for comparative (Control) rubber compound 2 as compared to comparative (Control) rubber compound 1 in which non-functionalized polybutadiene A was replaced by the non-functionalized polybutadiene B. However, the extent of improvement was not as significant as the extent of improvement observed for rubber compounds 3, 4 and 5 using functionalized polybutadienes C through E. Overall, it is seen that the greatest improvement was observed for rubber compounds 4 and 5 which used TEOS functionalized polybutadiene D and imine-TEOS functionalized polybutadiene E, respectively, which were observed to be the most effective in enhancing the hysteresis loss properties of the rubber composition.

This is considered to be significant in the sense that the rubber compounds 3, 4 and 5 with their observed beneficial high rebound values and low hysteresis loss tan delta values at room temperature (about 23° C.) and at high temperature (100° C.) are considered herein to be predictive of a relatively low rate of internal heat built up, with an attendant relatively low rate of internal temperature rise to promote a resultant beneficially reduced rolling resistance for a vehicular tire having an outer tire sidewall rubber layer or subtread rubber layer (component) composed of such rubber composition with a resultant expected improved fuel economy for an associated vehicle using such tire as compared to using the non-functionalized polybutadiene elastomers in the rubber compound.

It can also further be seen from Table 2 that the abrasion resistance of the rubber composition was in general improved or at least maintained for silica reinforcement-containing rubber compounds 3, 4 and 5, using the functionalized polybutadiene rubbers C through E, as compared to comparative (Control) rubber compound 1 using the non-functionalized polybutadiene rubber.

This is considered to be significant in a sense that the enhancement of compound hysteresis properties from the use of functionalized polybutadienes C through E for rubber compounds 3, 4 and 5 in combination with the precipitated silica and silica coupling agent was not obtained at the expense of abrasion resistance of the rubber composition.

This example demonstrates the desirability and benefit of using a functionalized polybutadiene such as functionalized polybutadienes C through E, which contained precipitated silica reinforcement, for enhanced rubber composition hysteresis loss properties, for an outer tire sidewall rubber layer or subtread rubber layer (component) for a vehicular tire composed of such rubber composition with a resultant expected improved, hence a predictive improved, rolling resistance performance for the tire without significantly compromising the abrasion resistance property.

EXAMPLE II

Rubber compositions (rubber compounds) composed of a combinations of natural rubber (cis 1,4-polyisoprene rubber) and various polybutadiene rubbers, as well as rubber compositions containing functionalized cis 1,4-polybutadiene elastomers, were prepared.

The rubber compounds 1 through 5 for of Example I are similar to rubber compounds 6 through 10, respectively, for this Example II insofar as the polybutadiene and functionalized polybutadiene elastomers used.

For this Example II, the rubber compositions (compounds) were prepared in the manner of Example I except that the precipitated silica, together with the silica coupling agent, were added in the first non-productive mixing stage (NP1), as in Example I, and the carbon black was added in the second non-productive mixing stage (NP2), therefore subsequent to and entirely separate from the silica to demonstrate an alternate method of preparation of the respective rubber compositions.

The basic recipe for the rubber compounds is presented in the following Table 3 and recited in parts by weight unless otherwise indicated.

The recipe is similar to the recipe recited in Table 1 of Example I except for the indicated addition of the carbon black in the second non-productive mixing step (NP2).

TABLE 3

|  | Parts |
| --- | --- |
| Non-Productive Mixing Step (NP1), (mixed to about 160° C.) | |
| Cis 1,4-Polyisoprene natural rubber[1] | 50 |
| Polybutadiene rubber[2] | 50 |
| Silica[3] | 30 |
| Silica coupling agent[4] | 2.4 |
| Rubber processing oil and resin | 7 |
| Wax and antioxidant | 5.5 |
| Stearic acid | 1 |
| Non-Productive Mixing Step (NP2), (mixed to about 160° C.) | |
| Carbon black N550 (N550 is an ASTM designation) | 30 |
| Productive Mixing Step (PR), (mixed to about 110° C.) | |
| Sulfur | 1.5 |
| Zinc oxide | 1.5 |
| Antioxidant | 1.25 |
| Sulfenamide sulfur cure accelerator | 2.1 |

The following Table 4 illustrates processing characteristics and various physical properties of rubber compositions based upon the basic recipe of Table 3.

TABLE 4

| | Rubber Compound Numbers | | | | |
| --- | --- | --- | --- | --- | --- |
| | 6 | 7 | 8 | 9 | 10 |
| Elastomers (phr) | | | | | |
| Natural Rubber | 50 | 50 | 50 | 50 | 50 |
| Cis 1,4-polybutadiene A | 50 | 0 | 0 | 0 | 0 |
| Cis 1,4-polybutadiene B | 0 | 50 | 0 | 0 | 0 |
| Amine functionalized polybutadiene C | 0 | 0 | 50 | 0 | 0 |
| TEOS functionalized polybutadiene D | 0 | 0 | 0 | 50 | 0 |
| Imine-TEOS functionalized polybutadiene E | 0 | 0 | 0 | 0 | 50 |
| Rheometer, 170° C. | | | | | |
| Maximum torque (dNm) | 16 | 16.6 | 17 | 17.9 | 18.6 |
| Minimum torque (dNm) | 3 | 3.2 | 2.9 | 3.9 | 4.7 |
| T90 (minutes) | 3.5 | 3.5 | 4.1 | 4 | 3.9 |
| Mooney Scorch, 120° C. | | | | | |
| Scorch time 5 pt rise (minutes) | 33.5 | 31.9 | 34.8 | 35.8 | 35.5 |
| RPA Analyzer, 100° C. | | | | | |
| Cured G' at 1% strain (MPa) | 2.3 | 2.3 | 2.5 | 2.5 | 2 |
| Cured G' at 10% strain (MPa) | 1.4 | 1.5 | 1.6 | 1.6 | 1.6 |
| Tan delta at 10% strain | 0.158 | 0.137 | 0.139 | 0.136 | 0.123 |
| Stress-strain, ATS, 11 min, 170° C. | | | | | |
| Tensile strength (MPa) | 19.2 | 19.4 | 19.6 | 19.6 | 17.7 |
| Elongation at break (%) | 713 | 680 | 696 | 687 | 590 |
| 100% modulus (MPa) | 1.4 | 1.4 | 1.5 | 1.6 | 1.6 |
| 300% modulus (MPa) | 6.4 | 6.7 | 6.3 | 6.8 | 7.5 |
| Rebound | | | | | |
| 23° C. | 51.4 | 54.3 | 55.1 | 56.7 | 58.8 |
| 100° C. | 61.2 | 63.3 | 63.3 | 65.5 | 67.8 |
| Shore A Hardness | | | | | |
| 23° C. | 59 | 59 | 60 | 62 | 62 |
| 100° C. | 54 | 55 | 55 | 57 | 58 |

TABLE 4-continued

|  | Rubber Compound Numbers | | | | |
| --- | --- | --- | --- | --- | --- |
|  | 6 | 7 | 8 | 9 | 10 |
| DIN Abrasion, 23° C. | | | | | |
| Relative Vol. Loss | 77 | 68 | 81 | 78 | 73 |
| RDS Strain Sweep, 10 Hertz, 30° C. | | | | | |
| Storage modulus (G') at 10% strain, (MPa) | 1.5 | 1.5 | 1.7 | 1.7 | 1.8 |
| Tan delta, at 10% strain | 0.157 | 0.140 | 0.136 | 0.128 | 0.116 |

It can be seen from Table 4 that, as in Example 1, that the replacement of high cis 1,4 polybutadiene rubber A with cis 1,4-polybutadiene rubber B or functionalized polybutadiene rubber C through E did not affect the rubber processing (Mooney scorch time) and cure dynamics (MDR analysis) of the rubber composition.

This is considered to be significant in a sense, as will be discussed hereafter, that the enhancement of physical properties such as rebound and hysteresis loss indicative tan delta by the use of functionalized polybutadienes C through E instead of the non-functionalized polybutadiene elastomers A and B, in combination with silica and a silane coupling agent, was not at the expense of processibility, insofar as the Mooney scorch time as well as T90 cure time were concerned, of the rubber composition.

It can further be seen from Table 4 that the rebound values at room and high temperatures of the rubber composition were significantly improved through the use of functionalized polybutadiene in combination with silica and a silane coupling agent. The rebound value at 23° C. and 100° C. of the rubber compound 10 containing the imine-TEOS functionalized polybutadiene, for example, was about 7 points higher than that of the comparative (Control) rubber compound 6.

Also, it can further be seen that the hysteresis loss indicative tan delta at 30° C. of the rubber composition was significantly enhanced (reduced) as a result of replacing the non-functionalized cis 1,4-polybutadiene elastomer A or B of rubber Comparative (Control) rubber compounds 6 and 7 with the amine, TEOS and imine-TEOS functionalized cis 1,4-polybutadiene elastomers C through E for the rubber compounds 8, 9 and 10.

In particular, the tan delta values for rubber compounds 8, 9 and 10 were only 0.136, 0.128 and 0.116, respectively, which were significantly lower that the value of 0.157 for comparative (Control) rubber compound 6.

Similarly, the hysteresis loss tan delta value at the higher temperature of 100° C. of the rubber compound 10, for example, was beneficially significantly lower than that of the Comparative (Control) rubber compound 6.

Some improvement in rebound and hysteresis loss tan delta was seen when non-functionalized polybutadiene B was used to replace the non-functionalized polybutadiene A. However, the degree of improvement was not as significant as that achieved through the use of functionalized polybutadiene C, D or E. Overall, TEOS and imine-TEOS functionalized polybutadienes D and E are seen as being the most effective in enhancing the hysteresis loss properties of the rubber composition as seen from rubber compounds 9 and 10.

This is considered to be significant in the sense that a rubber composition with high rebound values and low hysteresis loss tan delta values at room and high temperatures are predictive of low internal heat build up during the working of the rubber composition with an attendant low temperature rise and predictive of reduced rolling resistance for a tire with a tire component such as for example, outer sidewall rubber layer or subtread rubber layer composed of such rubber composition with a predictive improved fuel economy for an associated vehicle.

It can be noted that, in comparison with adding carbon black, silica and the silica coupling agent together in the first non-productive mixing stage (NP1) followed by a second non-productive mixing stage (NP2) without further addition of ingredients as presented in Example 1, adding silica and the silane coupling agent in first non-productive mixing stage (NP1) followed by addition of the carbon black in the second non-productive mixing stage (NP2) for this Example II led to an observed less improvement in the hysteresis loss properties of the rubber composition through the use of functionalized polybutadiene for the rubber composition which also contained the silica and silica coupling agent.

It can also further be seen from Table 4 that the abrasion resistance of the rubber composition was in general improved or at least maintained through the use of functionalized polybutadiene in combination with silica and a silica coupling agent. This is considered to be significant in a sense that the enhancement of rubber composition hysteresis properties from the use of functionalized polybutadiene in combination with silica and a silane coupling agent, with the carbon black being added in the second non-productive mixing stage, was not at a significant expense of the abrasion resistance of the rubber composition.

This example demonstrates a significant benefit relating to the addition sequence of carbon black, silica and silica coupling agent in achieving the desirable hysteresis loss properties of the rubber composition when functionalized polybutadiene is used to replace the non-functionalized cis 1,4-polybutadiene rubber.

EXAMPLE III

Rubber compositions (compounds) composed of a combinations of natural rubber (cis 1,4-polyisoprene rubber) and various polybutadiene rubbers, including functionalized polybutadiene elastomers, were prepared.

The rubber compounds 1 through 5 of Example I are similar to rubber compounds 11 through 15, respectively, for this Example III insofar as polybutadienes and functionalized polybutadienes used are concerned.

For this Example III, the rubber compositions were prepared in the manner of Example I except that the precipitated silica, together with the silica coupling agent, were added in the second non-productive mixing stage (NP2) and carbon black was added in the first non-productive mixing stage (NP1) to demonstrate an alternate method of preparation of the respective rubber compositions.

The basic recipe for the rubber samples is presented in the following Table 5 and recited in parts by weight unless otherwise indicated.

The recipe is similar to the recipe recited in Table 1 of Example I except, as indicated above, that the addition of the silica and silica coupling agent is made in the second non-productive mixing step (NP2) instead of the first non-productive mixing step (NP1) as was done in the previous Example I.

The rubber compositions were prepared in the manner of Example II in a sense of mixing the ingredients in three sequential mixing steps, namely a non-productive mixing step (NP1) followed by second non-productive mixing step (NP2) and then by a productive mixing step (PR) in which sulfur curatives were added.

The basic recipe for the rubber compounds is presented in the following Table 5 and recited in parts by weight unless otherwise indicated.

TABLE 5

| | Parts |
|---|---|
| Non-Productive Mixing Step (NP1), (mixed to about 160° C.) | |
| Cis 1,4-Polyisoprene natural rubber[1] | 50 |
| Polybutadiene rubber[2] | 50 |
| Carbon black N550 (N550 is an ASTM designation) | 30 |
| Rubber processing oil and resin | 7 |
| Wax and antioxidant | 5.5 |
| Stearic acid | 1 |
| Non-Productive Mixing Step (NP2), (mixed to about 160° C.) | |
| Silica[3] | 30 |
| Silica coupling agent[4] | 2.4 |
| Productive Mixing Step (PR), (mixed to about 110° C.) | |
| Sulfur | 1.5 |
| Zinc oxide | 1.5 |
| Antioxidant | 1.25 |
| Sulfenamide sulfur cure accelerator | 2.1 |

The following Table 6 illustrates processing characteristics and various physical properties of rubber compositions based upon the basic recipe of Table 5.

TABLE 6

| | Rubber Compound Numbers | | | | |
|---|---|---|---|---|---|
| | 11 | 12 | 13 | 14 | 15 |
| Elastomers (phr) | | | | | |
| Natural Rubber | 50 | 50 | 50 | 50 | 50 |
| Cis 1,4-polybutadiene A | 50 | 0 | 0 | 0 | 0 |
| Cis 1,4-polybutadiene B | 0 | 50 | 0 | 0 | 0 |
| Amine Functionalized polybutadiene C | 0 | 0 | 50 | 0 | 0 |
| TEOS functionalized polybutadiene D | 0 | 0 | 0 | 50 | 0 |
| Imine-TEOS functionalized polybutadiene E | 0 | 0 | 0 | 0 | 50 |
| Rheometer, 170° C. | | | | | |
| Maximum torque (dNm) | 16.6 | 17.6 | 18.2 | 19.8 | 18.6 |
| Minimum torque (dNm) | 3.1 | 3.2 | 3.1 | 4.3 | 4.9 |
| T90 (minutes) | 3.8 | 3.6 | 4.2 | 4 | 3.9 |
| Mooney Scorch, 120° C. | | | | | |
| Scorch time 5 pt rise (minutes) | 38.8 | 33.9 | 38.1 | 34.1 | 37.2 |
| RPA Analyzer, 100° C. | | | | | |
| Cured G' at 1% strain (MPa) | 2.4 | 2.5 | 2.7 | 2.8 | 2.4 |
| Cured G' at 10% strain (MPa) | 1.7 | 1.8 | 2.0 | 2 | 1.9 |
| tan delta at 10% strain | 0.157 | 0.147 | 0.152 | 0.136 | 0.121 |
| Stress-strain, ATS, 11 min, 170° C. | | | | | |
| Tensile strength (MPa) | 18.3 | 20.4 | 19.7 | 19.8 | 19.4 |
| Elongation at break (%) | 708 | 725 | 716 | 680 | 667 |
| 100% modulus (MPa) | 1.3 | 1.4 | 1.5 | 1.7 | 1.5 |
| 300% modulus (MPa) | 5.9 | 6.3 | 6.1 | 6.9 | 6.9 |
| Rebound | | | | | |
| 23° C. | 49.9 | 52.6 | 53.6 | 55.6 | 57.6 |
| 100° C. | 59.4 | 61.3 | 61.9 | 64.7 | 65.4 |
| Shore A Hardness | | | | | |
| 23° C. | 60 | 60 | 62 | 63 | 61 |
| 100° C. | 54 | 55 | 56 | 58 | 57 |
| DIN Abrasion, 23° C. | | | | | |
| Relative Vol. Loss | 78 | 73 | 87 | 81 | 78 |
| RDS Strain Sweep, 10 Hertz, 30° C. | | | | | |
| Storage modulus (G') at 10% strain, (MPa) | 1.5 | 1.5 | 1.8 | 1.8 | 1.7 |
| Tan delta at 10% strain | 0.167 | 0.148 | 0.142 | 0.132 | 0.126 |

It can be seen from Table 6 that, as in Example 1 and Example II, the replacement of high cis 1,4 polybutadiene rubber A with cis 1,4-polybutadiene rubber B or functionalized polybutadiene rubber C through E did not affect the rubber composition processing (Mooney scorch time) and cure dynamics (MDR analysis) of the rubber composition.

This is considered to be significant in a sense, as will be discussed hereafter, that the enhancement of the indicated physical properties of the rubber composition by the use of functionalized polybutadiene in combination with silica and a silane coupling agent was not at a significant the expense of processibility of the rubber composition.

It can further be seen from Table 6 that the rebound values at room and high temperatures of the rubber composition were beneficially significantly improved through the use of functionalized polybutadiene in combination with silica and a silane coupling agent. The rebound value at 23° C. and 100° C. of the rubber compound 15 using the imine-TEOS functionalized polybutadiene E, for example, was about 6 to 7 points higher than that of the comparative (Control) rubber compound 11 using the non-functionalized polybutadiene A.

Also, it can further be seen that the hysteresis loss indicative tan delta at 30° C. of the rubber composition was significantly enhanced (reduced) as a result of replacing the non-functionalized cis 1,4-polybutadiene elastomer A or B of rubber compounds 11 and 12 with the amine, TEOS and imine-TEOS functionalized cis 1,4-polybutadiene elastomers C through E for the rubber compounds 13, 14 and 15.

In particular, the tan delta values for rubber compounds 13, 14 and 15 were only 0.142, 0.132 and 0.126, respectively were significantly lower that the value of 0.167 for comparative (Control) rubber compound 11.

Similarly, the hysteresis loss tan delta value at the higher temperature of 100° C. of the rubber compound 15, for example, was beneficially significantly lower than that of the comparative (Control) rubber compound 11.

Some improvement is observed in rebound property and loss tan delta predictive hysteresis loss property when non-functionalized polybutadiene rubber B in Control rubber Sample 12 the non-functionalized polybutadiene rubber A in comparative (Control) rubber compound 11.

However, the degree of improvement was not as significant as that achieved through the use of functionalized polybutadiene rubber. Overall, TEOS functionalized polybutadiene rubber D and imine-TEOS functionalized polybutadiene E are seen as being the most effective in enhancing the hysteresis loss properties of the rubber composition. This is considered to be significant in the sense that a rubber composition with high rebound values and low hysteresis loss tan delta values at room and high temperatures would predictively low internal heat build up during working conditions for the rubber, with an attendant lower rate of internal temperature and a predictive reduced rolling resistance for a tire with a component such as, for example, outer sidewall rubber layer or subtread rubber layer composed of such rubber composition with an attendant improved fuel economy for an associated vehicle.

It can be noted that, in comparison with adding silica and the silane coupling agent in the first non-productive mixing stage (NP1) and carbon black in the second non-productive mixing stage (NP2) as shown in Example II, adding carbon black in first non-productive mixing stage (NP1) and silica and the silane coupling agent in the second non-productive mixing stage (NP2) for this Example III is seen to lead to even less improvement in the hysteresis loss properties of the rubber composition through the use of functionalized polybutadiene in combination with silica and a silane coupling agent.

It can also further be seen from Table 6 that the abrasion resistance of the rubber composition was in general maintained through the use of functionalized polybutadiene in combination with silica and a silane coupling agent. This is considered to be significant in a sense that the aforesaid enhancement of hysteresis properties of the rubber composition from the use of functionalized polybutadiene in combination with silica and a silane coupling agent was not at a significant expense of the abrasion resistance of the rubber composition.

This example demonstrates the desirability and benefit of using functionalized polybutadiene in combination with silica and a silane coupling agent for enhanced hysteresis loss properties for the rubber composition, hence predictive rolling resistance performance without significant compromising of other indicated physical properties of the rubber composition. This example also illustrates the importance of the addition sequence of carbon black, silica and silane coupling agents in achieving the desirable hysteresis loss properties of the rubber composition when functionalized polybutadiene is used to replace non-functionalized cis 1,4 polybutadiene such as the non-functionalized polybutadiene (A).

The following Table 7 is presented to focus upon a summary of a significant procedural aspect of Examples I, II and III in a sense of showing relative improvements in rebound and Tan delta property values resulting from variations in order of addition of rubber reinforcing carbon black and precipitated silica to the rubber composition.

TABLE 7

| Polybutadiene (PBd)/Natural Rubber Blend Compositions | Rubber Compounds | | |
|---|---|---|---|
| | From Example I | From Example II | From Example III |
| Rebound, at 100° C. decrease in rebound is indicative of reduction in hysteresis loss property | | | |
| | Rebound Value per (Rubber Compound No.) | | |
| With cis 1,4-polybutadiene A | 58.5 (1) | 61.2 (6) | 59.4 (11) |
| With cis 1,4-polybutadiene B | 62.3 (2) | 63.3 (7) | 61.3 (12) |
| With Amine Functionalized polybutadiene C | 65.2 (3) | 63.3 (8) | 61.9 (13) |
| With TEOS Functionalized polybutadiene D | 66.4 (4) | 65.5 (9) | 64.7 (14) |
| With Imine-TEOS Functionalized polybutadiene E | 68.3 (5) | 67.8 (10) | 65.4 (15) |

TABLE 7-continued

Strain Sweep analysis by RDS analytical apparatus,
at 10 Hertz, 30° C.
Tan delta value taken at 10 percent strain - an increase in Tan
delta value is indicative of reduction in hysteresis loss property

| | Tan delta Value per (Rubber Compound No.) | | |
|---|---|---|---|
| With cis 1,4-polybutadiene A | 0.162 (1) | 0.157 (6) | 0.167 (11) |
| With cis 1,4-polybutadiene B | 0.139 (2) | 0.140 (7) | 0.148 (12) |
| With Amine Functionalized polybutadiene C | 0.126 (3) | 0.136 (8) | 0.142 (13) |
| With TEOS Functionalized polybutadiene D | 0.118 (4) | 0.128 (9) | 0.132 (14) |
| With Imine-TEOS Functionalized polybutadiene E | 0.118 (5) | 0.116 (10) | 0.126 (15) |

Summary of Mixing Sequences for Carbon Black and Silica For Examples I, II and III
For Example I   Carbon black, silica and coupling agent are all added in first non-productive mixing stage
For Example II  Silica and coupler are added in first non-productive mixing stage and carbon black is added separately in a subsequent second non-productive mixing stage
For Example III Carbon black are added in first non-productive mixing stage and Silica with coupler are added separately in a subsequent second non-productive mixing stage It can be seen from the summary presented in Table 7 that:

(A) that the best improvement in the hysteresis loss property (namely an increase in the rebound and decrease in Tan delta properties) was observed in Example I for rubber compounds 3, 4 and 5 containing the functionalized polybutadienes for which carbon black, silica and coupling agent were added together with the functionalized polybutadiene in the first non-productive mixing stage (NP1).

(B) a lesser and more moderate improvement in the hysteresis loss property (moderate increase in rebound and moderate decrease in Tan delta properties) was observed in Example II for rubber compounds 8, 9 and 10 containing the functionalized polybutadienes when precipitated silica, together with coupling agent were added with the functionalized polybutadiene in a first non-productive mixing step, or stage (NP1), and the carbon black added in a second non-productive mixing step, or stage (NP2) to the rubber composition from said first non-productive mixing stage. Therefore, the carbon black was added subsequent to and separately from the precipitated silica addition.

(C) the least improvement in the hysteresis loss property (moderate increase in rebound and moderate decrease in Tan delta properties) was observed in Example III for rubber compounds 13, 14 and 15 containing the functionalized polybutadienes when carbon black was added with the functionalized polybutadiene in a first non-productive mixing step (NP1) and precipitated silica, together with coupling agent, were added in a second non-productive mixing step (NP2) to the rubber composition from the first non-productive mixing stage. Therefore, the silica was added subsequent to and separate from the carbon black addition.

Therefore, in further accordance with this invention, the tire is provided where the rubber composition for at least one of said outer sidewall rubber layer and said subtread rubber layer is prepared by:

(A) mixing rubber reinforcing carbon black, precipitated silica and silica coupling agent together with said functionalized cis 1,4-polybutadiene elastomer in a preparatory non-productive mixing step (NP), followed by a productive mixing step (PR) in which sulfur curatives are added, or (B) mixing precipitated silica, together with coupling agent, are together with said functionalized cis 1,4-polybutadiene elastomer in a first preparatory non-productive mixing step (NP) followed by mixing rubber reinforcing carbon black in a subsequent sequential second non-productive mixing step (NP) to the rubber composition from said first non-productive mixing step, followed by a productive mixing step (PR) in which sulfur curatives are added, or (C) mixing carbon black mixed with the functionalized cis 1,4-polybutadiene elastomer in a preparatory first non-productive mixing stage (NP) followed by mixing precipitated silica and coupling agent in a subsequent sequential non-productive mixing step (NP) to the rubber composition from said first non-productive mixing step, followed by a productive mixing step (PR) in which sulfur curatives are added;

wherein said mixing steps are preferably conducted in an internal rubber mixer to a temperature in a range of from about 140° C. to about 170° C. for said non-productive steps and a temperature in a range of from about 100° C. to about 120° C. for said productive mixing steps, and wherein said rubber compositions are cooled to a temperature below 40° C. between said mixing steps.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having at least one of an outer sidewall rubber layer and subtread rubber layer of a rubber composition comprised of, based on parts by weight per 100 parts by weight of rubber (phr):

(A) Conjugated diene-based elastomers comprised of:
(1) about 20 to about 80 phr of a siloxy-aldimine functionalized cis 1,4-polybutadiene elastomer having amine functionality in its molecular chain and an end terminating group reactive with hydroxyl groups contained on said precipitated silica provided by a terminating compound containing a siloxy and an aldimine group represented by the general formula (II):

$$RCH = N(CH_2)_x Si(OR^1)_y R^2_{3-y}$$ (II)

wherein R represents a phenyl group; $R^1$ and $R^2$ may be the same or different and each independently represents a group having 1 to 18 carbon atoms selected from an alkyl, a cycloalkyl, an allyl, or an aryl, wherein at least one $R^1$ group is an ethyl radical; x is an integer from 1 to 20; and y is an integer from 1 to 3, 2) about 20 to about 80 phr of at least one additional conjugated diene based elastomer comprised of at least one of polymers of at least one of isoprene and 1,3-butadiene and copolymers of styrene and at least one of isoprene and 1,3-butadiene, and
(B) about 30 to about 70 phr of rubber reinforcing filler comprised of rubber reinforcing carbon black and precipitated silica as:
  (1) about 20 to about 60 phr of said rubber reinforcing carbon black, and
  (2) about 20 to about 60 phr of said precipitated silica, and
(C) coupling agent for said precipitated silica having a moiety reactive with hydroxyl groups on said precipitated silica and another different moiety interactive with said elastomer(s).

2. The tire of claim 1 wherein said subtread rubber layer is exclusive of cord reinforcement.

3. The tire of claim 1 wherein said end terminating compound containing a siloxy and an aldimine group is represented by the general formula (IV):

$$RCH{=}N(CH_2)_x Si(OR^1)_2 CH_3 \qquad (IV)$$

where R is a phenyl group and where x is an integer in a range of from 1 to 20 and where $R^1$ is an alkyl group and at least one of $R^1$ is an ethyl group.

* * * * *